(12) United States Patent
Wang (10) Patent No.: US 8,832,293 B2
(45) Date of Patent: Sep. 9, 2014

(54) BANDWIDTH ALLOCATION WITH MODIFIED SEEK FUNCTION

(75) Inventor: Dong Wang, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 553 days.

(21) Appl. No.: 12/875,892

(22) Filed: Sep. 3, 2010

(65) Prior Publication Data

US 2012/0059946 A1    Mar. 8, 2012

(51) Int. Cl.
| | | |
|---|---|---|
| G06F 15/16 | (2006.01) | |
| H04L 29/06 | (2006.01) | |
| H04N 21/2387 | (2011.01) | |
| H04N 21/81 | (2011.01) | |
| H04N 21/63 | (2011.01) | |
| H04N 21/262 | (2011.01) | |
| H04N 21/6405 | (2011.01) | |
| H04N 21/643 | (2011.01) | |
| H04N 21/845 | (2011.01) | |
| H04L 12/56 | (2006.01) | |

(52) U.S. Cl.
CPC ........ *H04L 65/4084* (2013.01); *H04N 21/2387* (2013.01); *H04N 21/812* (2013.01); *H04L 65/4092* (2013.01); *H04N 21/632* (2013.01); *H04N 21/26266* (2013.01); *H04N 21/6405* (2013.01); *H04N 21/64322* (2013.01); *H04N 21/8456* (2013.01); *H04L 47/125* (2013.01)
USPC ........................................................ 709/231

(58) Field of Classification Search
USPC .......... 709/231–234; 725/95–97, 87, 88, 101, 725/103
See application file for complete search history.

(56) References Cited

U.S. PATENT DOCUMENTS

| 7,111,316 B1 * | 9/2006 | Zahorjan et al. ................ 725/97 |
| 7,260,601 B1 * | 8/2007 | Day et al. ...................... 709/203 |
| 7,698,724 B1 * | 4/2010 | Day ............................ 725/97 |
| 7,987,479 B1 * | 7/2011 | Day ............................ 725/34 |
| 2002/0194622 A1 * | 12/2002 | Lord ............................ 725/143 |
| 2003/0074667 A1 * | 4/2003 | Cheung et al. ................. 725/95 |
| 2007/0174480 A1 * | 7/2007 | Cheung et al. ............... 709/233 |
| 2007/0220118 A1 * | 9/2007 | Loyer ......................... 709/219 |
| 2009/0013362 A1 * | 1/2009 | Liu et al. ..................... 725/110 |
| 2009/0210899 A1 * | 8/2009 | Lawrence-Apfelbaum et al. ............................. 725/34 |
| 2010/0017474 A1 * | 1/2010 | Kandekar et al. ............ 709/205 |
| 2010/0040343 A1 * | 2/2010 | Mihalov et al. ................ 386/68 |
| 2011/0051727 A1 * | 3/2011 | Cai et al. ...................... 370/390 |

OTHER PUBLICATIONS

International Search Report, PCT Application No. PCT/US2011/050404, mailed Jan. 17, 2012.

* cited by examiner

*Primary Examiner* — Backhean Tiv
(74) *Attorney, Agent, or Firm* — Fountainhead Law Group P.C.

(57) ABSTRACT

A computer-implemented method, apparatus, system, article of manufacture, and computer readable storage medium provide the ability to stream media content to multiple users. A first stream of/for the media content is streamed from a first location in the media content to a first user. A request is received from the first user to seek to a seek location (e.g., forward or backward) in the media content. A second location in the media content compatible with the seek location is determined. The second location is based on a second stream being streamed to one or more second users. The second stream is then streamed to the first user and the second user.

30 Claims, 6 Drawing Sheets

BANDWIDTH ALLOCATION WITH MODIFIED SEEK FUNCTION

BACKGROUND OF THE INVENTION

1. Field of the Invention

The present invention relates to systems and methods for providing streamed media programs and in particular, to a method and apparatus for improving bandwidth allocation while enabling the use of a seek function while streaming media programs to multiple users simultaneously.

2. Description of the Related Art

Media programs are often distributed (e.g., via streaming or download) across a network (e.g., the Internet) to multiple users. Often times, multiple different users may be viewing the same media content. Such viewing is often at a different time/location of the media content. For example, one viewer may be viewing a streamed media content program at the 14 minute mark, while another viewer may be viewing the same streamed media content program at the 35 minute mark. Streaming the same media program to multiple viewers but at different times consumes significant bandwidth. It is desirable to not only enable such streaming but to stream content while minimizing network bandwidth. Such problems may be better understood with a description of prior art streaming technology.

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

There are multiple different addressing schemes that may be used to stream content to one or more users. Such methods include unicast addressing, broadcast or multicast addressing, and anycast addressing.

For anycast addressing, content from a single sender is routed to the topologically nearest node in a group of potential receivers all identified by the same destination address. In other words, content is routed to a single member of a group of potential receivers that are all identified by the same destination address. Anycast is a one-to-one-of-many association.

Unicast addressing uses a one-to-one association between destination address and network endpoint. Each destination address uniquely identifies a single receiver endpoint. Thus, every user receives their own stream of content directly from the server in a unicast addressing environment.

In broadcast and multicast addressing, a one-to-many association, content is routed from a single sender to multiple endpoints simultaneously in a single transmission. The network automatically replicates content as needed for all network segments that contain an eligible receiver. With multicast addressing, content is delivered to a group of users simultaneously using a strategy that delivers the content over each link of the network only once, creating copies only when the links to the multiple destinations split. Further, in a multicast environment, the multicasting occurs at the IP routing level, where routers create optimal distribution paths for content sent to a multicast destination address spanning tree in real time.

In view of the above, many prior art systems utilize a multicast addressing system to deliver media content programs to one or more users. Using such a system consumes less bandwidth when distributed to multiple users. However, as described above, users may be viewing the same media program at different times. Such viewing may occur based on an initial request from a user or may be caused using a seek function in a viewing application. For example, when something is being streamed to a user, the viewer may seek (e.g., go forward or backward) using a scroll/progress/timeline bar to a different location in the media content being viewed.

In the prior art, when a viewer streams to a new location, a new transmission of the media content program is delivered to the user. Thus, bandwidth is consumed merely by the user seeking to a new location. It is desirable to enable a system to view a media content program at any time within the program desired, thereby enabling a seek operation, while still utilizing multicast addressing.

In addition, prior art systems may utilize peer-to-peer (P2P) software to distribute media content programs. In a P2P system, each user, while downloading a video stream, is simultaneously also uploading that stream to other users, thus contributing to the overall available bandwidth. Arriving streams are typically time delayed (e.g., by a few minutes) compared to the original sources. However, once again, bandwidth is consumed using such techniques and there is no efficient mechanism to perform seek operations while minimizing the bandwidth consumed.

Further, many prior art systems utilize and stream customized/directed advertisements to users with the media content. However, the ability to stream custom or directed advertisements to particular users while in a multicast or P2P environment can be problematic.

The problems described above with downloading and streaming may be better understood with an explanation of prior art progressive downloading and streaming technologies.

Progressive Downloading

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file (referred to as "seeking"). End-users may skip/seek through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) do not permanently store the video file in the viewer's computer (the file is ultimately discarded by the media player, thus allowing more control over the content).

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player 304 buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

In addition, as described above, the various techniques for streaming content require the consumption of bandwidth as the number of users/viewers increases. It is desirable to limit the bandwidth consumed by using multicast addressing for users/viewers streaming the same content. However, when users seek in a program while receiving streaming content, additional bandwidth is consumed as a media content must be retransmitted based on the new location being viewed by the user/viewer.

SUMMARY OF THE INVENTION

To address the requirements described above, a method, apparatus, article of manufacture, and a memory structure for streaming media content to multiple users. When a user is receiving streamed media content, the user may seek (e.g., forward or backward) to a different location in the media content. Embodiments of the system provide the ability to synchronize multiple users based on such a seek operation. In this regard, the system searches other streams/requested streams to find a stream that is compatible with the seek location requested. Such a compatible stream may consist of a different location in the media content than that requested (e.g., an established scene, shot, frame, etc.). For example, a user's request to seek to a frame located at 12:51 of a media program may redirect the request (or stream a responsive media program stream) to 12:50 or to another stream being viewed by a different user at or near that frame.

Once a compatible stream is located, the compatible stream is streamed (e.g., multicast) to the requesting user and the already viewing user. In this regard, embodiments of the invention are able to coordinate multiple viewers by streaming the same content. Such streaming capabilities reduces the consumption of bandwidth while allowing user controlled seek operations.

In addition, in some media programs, commercials or advertisement are required to be shown to a user based on the content being viewed. Embodiments of the invention may take such advertisements into account when streaming content. Further, if there is a delay between the requested seek location and the compatible location, the system may select an advertisement(s) (or other media content) of the appropriate time length (and which may be customized or a directed advertisement) and stream such an advertisement/media content to the requesting user until the capability to multicast has been reached (i.e., when the user viewing the compatible stream arrives at/near the location in the stream the requesting user desires to view).

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to synchronize multiple users based on seek operations that are performed. To provide such capabilities, embodiments direct users to specific points in a media program, rather than any random points. Specific points can be the beginning of a scene, a shot, a frame, an I-frame, etc. Accordingly, users are not able to scan to any point in the program they desire. Instead, they are able to scan to the nearest (or preceding) shot or scene. By directing multiple users in such a manner, the users are likely to receive the same signal stream thereby conserving bandwidth.

Hardware and Software Environment

Figure 1:
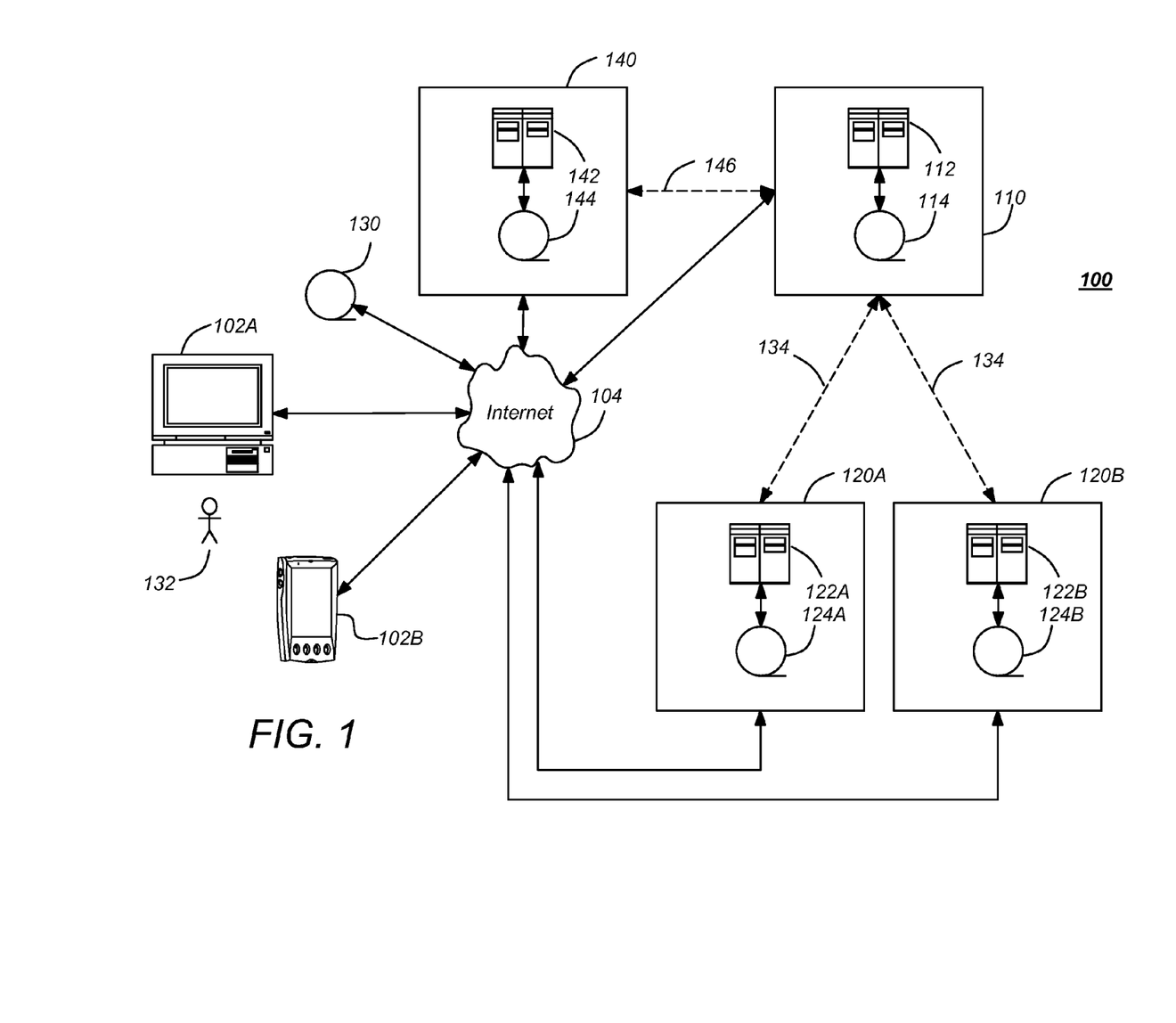
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 with a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
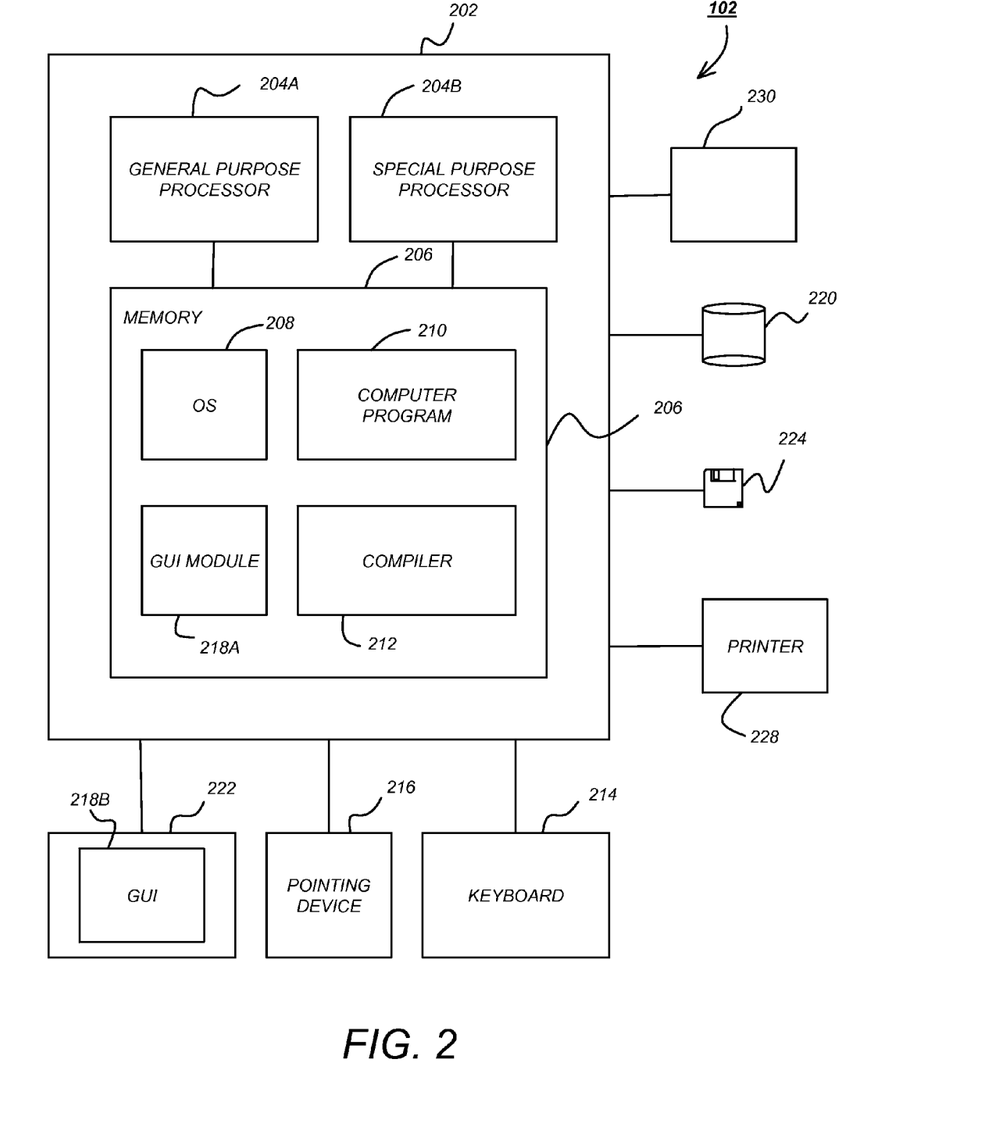
FIG. 2 illustrates an exemplary computer system that could be used to implement the present invention.

FIG. 2 illustrates an exemplary computer system 202 that could be used to implement elements of the present invention, including the user devices 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions or may be implemented in a special purpose processor 204B. Further, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/ or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, personal data assistants (PDAs) or any other device with suitable processing, communication, and input/output capability.

Figure 3:
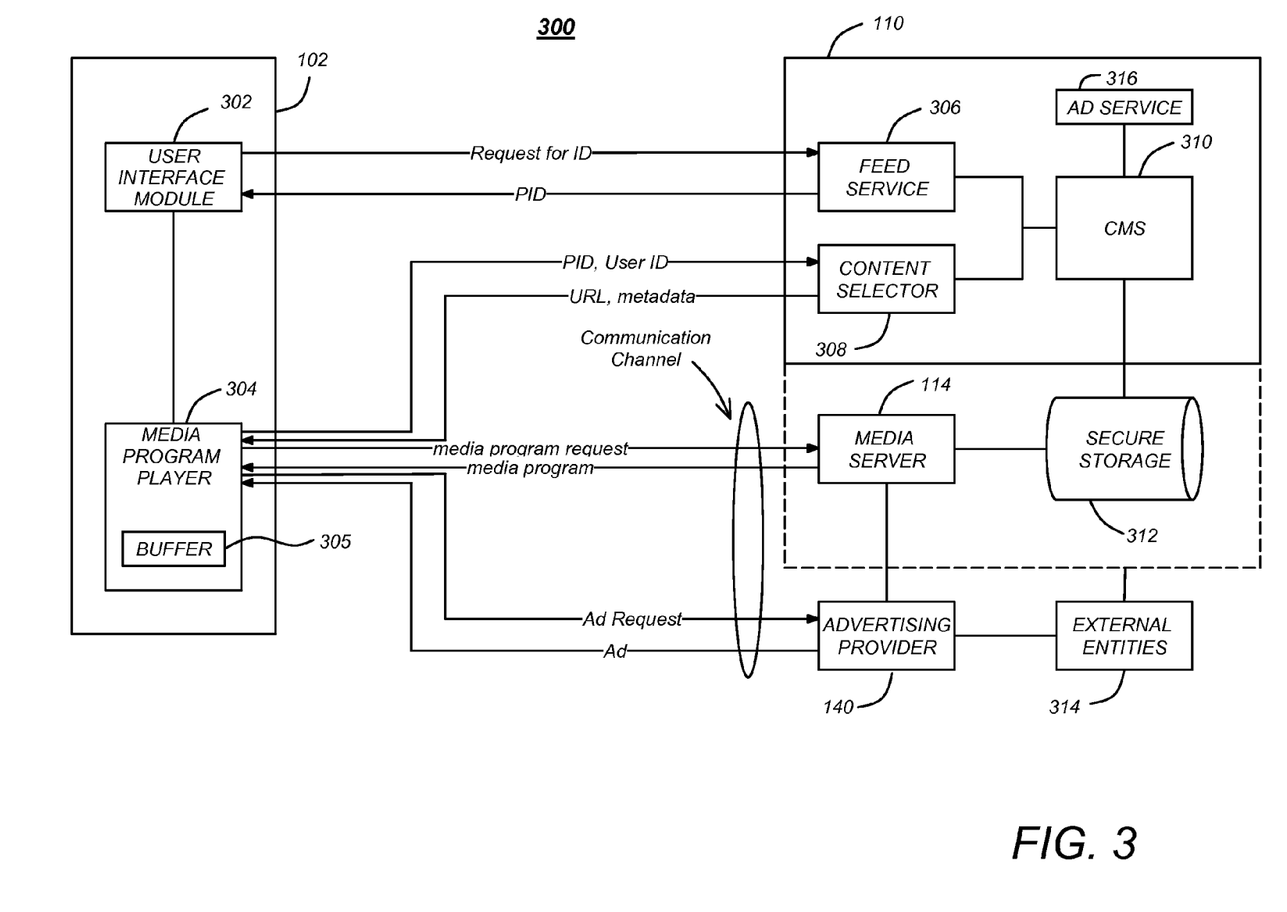
FIG. 3 is a diagram illustrating a content delivery subsystem and top-level operations that can be used to deliver media programs and advertisements for presentation to a user.

FIG. 3 is a diagram illustrating a first embodiment of a content delivery subsystem (CDS) 300 and top-level operations that can be used to deliver media programs and advertisements for presentation to the user 132 according to the HTTP, TCP, RSTP, or similar protocols. Using these protocols, the throughput of the data transmitted to the media program player 110 can be changed during media program delivery according to a request from the media program player 110 or on the initiative of the media server 114. For example, RTSP defines a speed request header field that requests that the media server deliver the data to the media program player at a particular speed, consistent with the media server's ability and desire to provide the media at that speed.

In the illustrated embodiment, the content delivery subsystem 300 includes the user device 102, a media program provider 110, and an advertisement provider 140. The media program provider 110 comprises a feed service 306, a content selector 308 and a content management service 310. When the user 132 selects a media program using the user device 102, a message is transmitted from the user device 102 to the media program provider 110 requesting the media program identifier (PID) of the selected media program. The feed service 306 receives the request, and using information obtained from secure storage 312 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 318, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 receives the transmitted media program, and may temporarily store the media program in buffer 305. Buffer 305 may include hardware and/or software buffering, and may be resident in the media program player 305, or elsewhere in the user device 102.

The user device 102 may also request advertisements from the advertising provider 120 and receive them as well. Typically, media server 114 has a plurality of versions of the media program, each suitable for communication channels of different throughput or bandwidth. Using information received from the user device 102 or elsewhere, the media player 114 determines the most appropriate version of the media program to transmit to the user device 102. This determination can be based, for example, upon the bandwidth or available bit rate of the communication channel used to transmit the media program to the user device 102, the throughput of the user device and the size and speed of the buffer 305 implemented in the user device 102.

The user device 102 then receives the media program. Typically, the media program data is stored in a hardware or software buffer 305 in the user device, and retrieved in a first-in-first-out (FIFO) manner. Since the average bit rate of the delivered media program version is less than the bandwidth capability of the communications channel, the buffer 305 fills while the media program is being played. Buffered data is available even when the communication channel bandwidth or the bit rate of the media program changes, and hence, the buffered data can be used to reduce choppy playback.

If the user device 102 determines that the media program is not being delivered at the required bit rate (the rate at which the data is consumed to play the media program exceeds the rate that the data is received to an extent wherein the buffer 305 cannot adequately prevent choppy playback), the user device 102 may send a message to the media server 114 requesting a different version of the media program (e.g. one suitable for transmission at a lower bit rate). Conversely, if the user device 102 determines that the media program is being delivered at greater than the required bit rate, the user device 102 may send a message to the media server requesting a version of the media program suitable for transmission at a higher bit rate. This may provide the user 132 with a higher resolution version of the media program.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information may be stored in the content delivery system 300 in database 312, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

In another embodiment, the foregoing is implemented without requiring the user device 102 to receive the PID and transmit it to the content selector, and instead, merely accepts a request for the media program from the user device and produces a URL and metadata that is transmitted to the user device 102 and used to obtain the media program from the media server 114.

Figure 4:
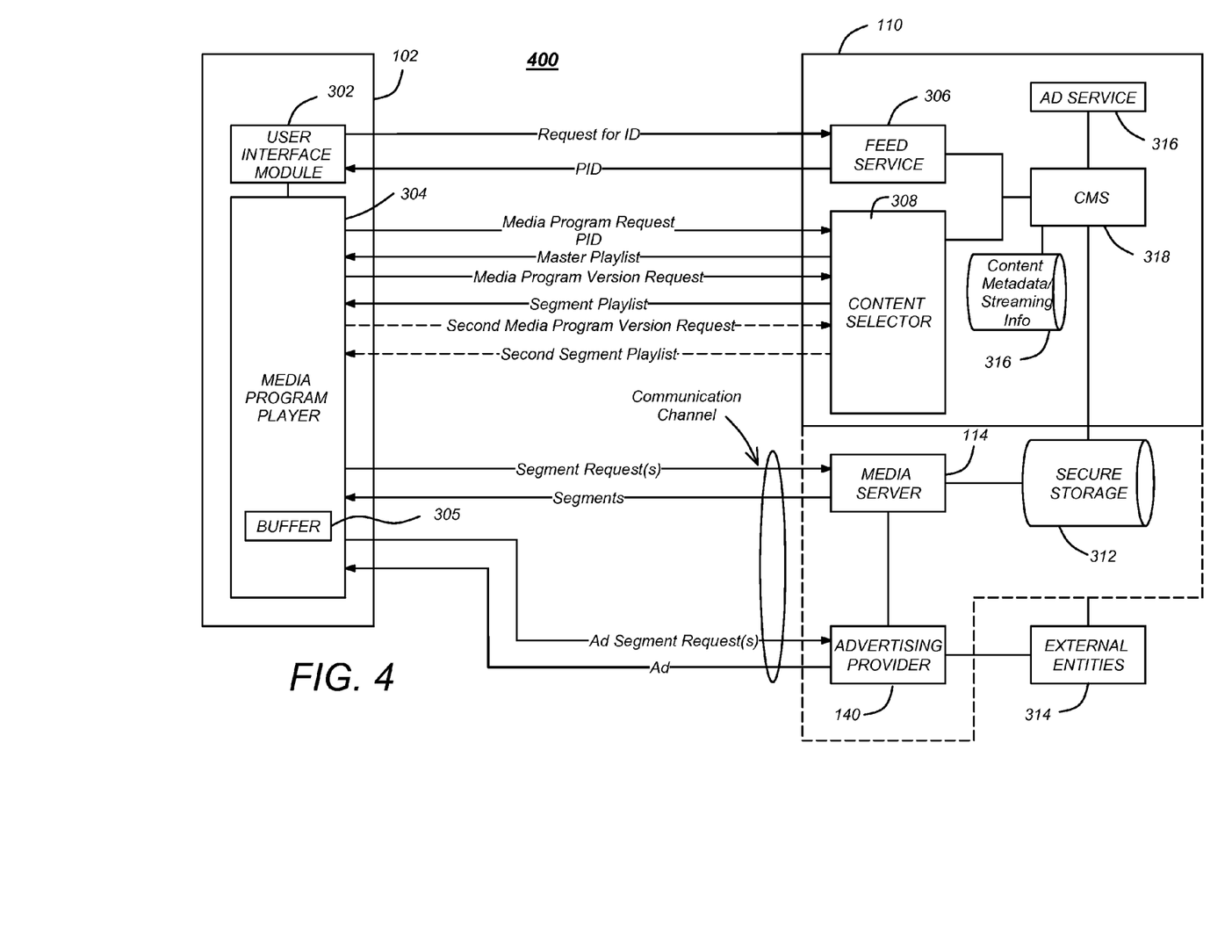
FIG. 4 is a diagram illustrating a content delivery system 400 that provides for the transmission of media programs according to a live streaming protocol.

FIG. 4 is a diagram illustrating a content delivery system 400 that provides for the transmission of media programs according to a live streaming protocol. This protocol is especially useful for mobile and wireless devices. Fundamentally, this protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 4, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

A media program request having the PID is then transmitted to a content selector 308, which forwards the information to the content management service 310. The content management system 318 uses the advertisement service 318 to select advertisements appropriate for the user and selected media program, using information stored in secure storage 312. Again, this may be accomplished as described in co-pending patent application Ser. No. 12/787,679 as described above. The content management service 310 forwards this information to the content selector 318. The content selector 308 may then generate a master playlist.

A master playlist may also be used to transmit content. The master playlist may include a plurality of links, each associated with a segment playlist for the media program expressed in different bit rates. For example, one link may be associated with a segment playlist for a 1.5 Mbps bit rate version of the media program. Another link may be associated with a segment playlist for a 3.2 MBPS version of the media program, while a third link may be associated with a 64 Kbps version of the media program.

The master playlist is then transmitted to the user device 102. The user device 102 selects the version of the media program most appropriate for reception and playback. This selection can be based, for example, on the bandwidth or throughput of the communications channel between the media server 114 and the user device 102 and/or the size and speed of any buffer(s) 305 in the user device 102. The user device 102 transmits a media program version request for the selected version of the media program to the content selector 308. The content selector 308 receives the media program version request, generates a segment play list, and transmits the segment playlist to the user device 102. The user device 102 receives the segment playlist and requests the segments in the playlist in the order indicated from the media server 114 or the advertising provider 140.

As described above, the delivery and presentation of digital media programs can be challenging because (1) the communication channel used to deliver the media program to the user device 102 is (a) typically of limited bandwidth and (b) can vary substantially over time and in mobile applications, the user's location, (2) the processing and presentation of the received media program by the user device 102 requires (a) significant throughput and processing speed which may change with time and (b) significant storage capacity and storage/retrieval speed of any buffering used in the user device 102.

As further described above, prior art techniques for delivering digital media programs often attempt to conserve bandwidth by using P2P, multicasting/broadcasting addressing schemes. However, it is not uncommon for viewers to frequently seek to new locations in a digital media program during viewing. For example, a viewer may move a slider on a progress timeline bar (that indicates the current time-based location within a media program) to a new location. Prior art techniques fail to provide the ability to multicast/broadcast digital media programs while also allowing seek capabilities. Further, prior art techniques also fail to provide custom/directed advertising while providing seek capabilities in a multicast/P2P environment.

Accordingly, synchronized streams to different users are desirable from the server point of view as the streams to different users can be shared and this reduces the bandwidth cost.

Synchronization of Media Content Delivery

Embodiments of the invention may be implemented on a computer program 210 executing within computer 202. In one or more embodiments, streams delivered to different/multiple users are synchronized/aligned based on the seek operations that are performed. To provide such capabilities, users are directed to specific points in a media program, rather than a random point. Specific points can be the beginning of a scene, a shot, a frame, an I-frame, etc.

Accordingly, users are not able to scan to any point in the program they desire. Instead, they are able to scan to the nearest (or preceding) shot or scene. By directing multiple users in such a manner, the users are likely to receive the same signal stream thereby conserving bandwidth.

Figure 5:
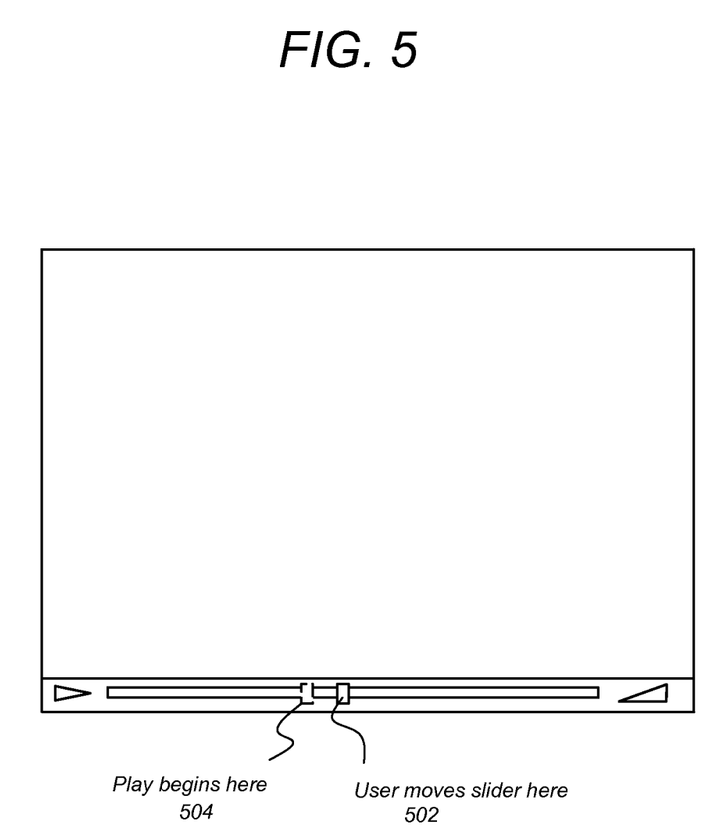
FIG. 5 illustrates a user interface indicating the redirection of a user's seek location to a synchronized location in accordance with one or more embodiments of the invention.

FIG. 5 illustrates a user interface indicating the redirection of a user's seek location to a synchronized location in accordance with one or more embodiments of the invention. When a user moves a play bar/slider to move forward or reverse in a video, instead of beginning streaming of the video from precisely the point that the user selects (i.e., location 502), the media program is streamed beginning at a point that is reasonably close, but not precisely where they selected (i.e., location 504). The point where video streaming may begin 504 is before the point where the viewer has selected 502, and at a point 504 where at least one other viewer is already viewing the video. Thereafter, the same video stream will be provided (e.g., multicast) to both users. Accordingly, if the user seeks to a certain point 502, the approximate location is matched up with someone else's seek/viewing point. Thus, multiple users are coordinated/synchronized to view from the same location in a given digital program.

Alternatively or in addition, the viewer could be directed to the beginning of the scene, shot, or even perhaps the preceding I-frame. In other words, synchronization of the stream may not simply be based on the location of another user, but could alternatively (or in addition) based on a shot, scene, frame, etc. Since all viewers would be subject to this, there is likely another viewer who will be at the point 504 in viewing the video program.

Consideration may also be made for the fact that depending on where the user scans 502, they may be shown advertisements (e.g., commercials) or other media content, and such advertisements/content may be played before replay of the media program begins. For example, suppose a first user directs the video to begin replay at 12:51 into the program while a second user is already streaming the video at 12:45. Without considering advertisements, the first user would be directed to the stream beginning at 12:45. However, if the first user has not seen the commercials before 12:51, the system would need to account for those commercials so that the selected stream includes sufficient time for the first user to view the commercials before joining in the stream. In other words, the first user may be directed to a location shortly after 12:45 while playing commercials for 30-60 seconds first. Alternatively, the first user may be synchronized with a different user in order to accommodate the commercial viewing that is required.

Alternatively, since the insertion of advertisements or alternative content may result in starting video other than where the user originally intended, some message may be shown so that the user does not try several times to get to the precise spot.

As an example, suppose User 2 is watching the middle point of a media program while User 1 is watching the beginning of the same media program. User 1 performs a seek operation to some place near the middle, a bit further than User 2. If one were to simply seek to User 1's input, additional bandwidth would be consumed and User 1 and User 2 would not be synchronized even though they are viewing the same content but at different points in the content. It has been found that users often are not very sensitive to the real position of the seek action, as they just want to skip a short section or portion of the video playing.

Accordingly, embodiments of the invention let User 1 wait for some time so that User 2 can catch up with him. User 1 may be bored if he/she is held with nothing to do. Accordingly, different yet still targeted advertisements/content may be played in different lengths to match the time gap of User 2 and User 1 in watching. By playing this specific advertisement, User 1 and User 2 can be aligned together.

This technique applies to the beginning of playing as well. For example, suppose User 1 arrives 30 second earlier than User 2. User 1 may be asked to consume an advertisement to wait for User 2. Further, as part of such a delay in viewing, a notification may be displayed to User 1 (e.g., "Please wait while video content is buffered/synchronized to improve your viewing quality."). During such a delay, embodiments of the invention may also determine the network bandwidth to both users and begin buffering the video content or transmitting some of the video content to the first or second user (e.g., if the waiting user's network connection is slower than that of the other user).

In addition to the above, any of the above described features can be restricted to non-subscribers.

Logical Flow

Figure 6:
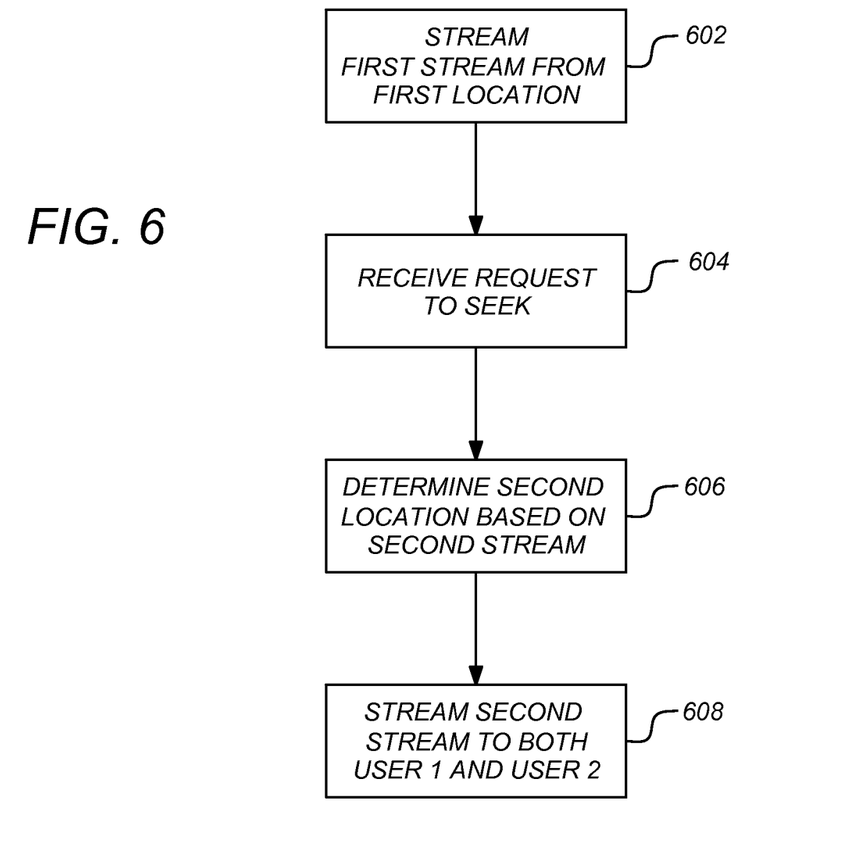
FIG. 6 is a flow chart illustrating the logical flow for streaming media content to multiple users in accordance with one or more embodiments of the invention.

FIG. 6 is a flow chart illustrating the logical flow for streaming media content to multiple users in accordance with one or more embodiments of the invention.

At step 602, a first stream of/for the media content is streamed from a first location in the media content to a first user.

At step 604, a request is received from the first user to seek to a seek location in the media content. The request may be received from the first user by moving a slider on a progress timeline bar for the first media content.

At step 606, a second location in the media content is determined. The second location is compatible with the seek location. Further, the second location is based on a second stream being streamed to one or more second users. In this regard, the second user may be selected from a large pool of users watching the same media content/video. Such a selection may be based on an optimization method. For example, the second location may be based on a shot or scene of the media content. In addition, the second location may be determined by analyzing media content streams being streamed to other users. In other words, the server that receives the seek request, searches the streams being transmitted to other users to find a stream that is compatible with the seek location requested by the user.

At step 608, the second stream is streamed to both the first user and the second user. Such a streaming synchronizes the viewing of the media content between the first user and the second user. In one or more embodiments, the streaming may be conducted by multicasting the second stream to the first and second users. Alternatively, a P2P network may be used to stream the second stream to both users. In addition to streaming the second stream, an advertisement may be streamed to the first user based on the second location/seek location. Such an advertisement may be a directed advertisement that is specifically directed to the first user based on attributes of the first user. In addition, the advertisement that is selected may be based on the time difference between the seek location and the second location in the second stream that the second user is receiving.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for streaming media content to multiple users comprising:

streaming a first stream for the media content, from a first location in the media content, to a first user, the first stream of media content being played in a user interface;

receiving a request from the first user to seek to a second location in the media content being played in the user interface, wherein the request to seek requests that the media content begin playing at the second location;

in response to receiving the request, selecting a second stream for the media content from a plurality of second streams for the media content being streamed to a plurality of second users at different locations in the media content, the second stream being selected based on the second location and a third location in which the selected second stream is being streamed to one or more second users;

determining the third location in the media content, the third location being different from the second location, but the third location determined to be compatible with the second location; and streaming the selected second stream to the first user and the one or more second users based on the determining of the third location.

2. The computer-implemented method of claim 1, wherein:
the request is received from the first user by moving a slider on a progress timeline bar in the user interface for the media content.

3. The computer-implemented method of claim 1, wherein:
the third location is based on a shot or scene of the media content.

4. The computer-implemented method of claim 1, wherein:
the third location is determined by analyzing other second streams in the plurality of second streams being streamed to other users in addition to the selected second stream being streamed to the one or more second users.

5. The computer-implemented method of claim 1, wherein:
the streaming of the selected second stream to the first user and the one or more second users synchronizes viewing of the media content between the first user and the one or more second users.

6. The computer-implemented method of claim 1, wherein:
the streaming of the selected second stream to the first user and the one or more second users comprises multicasting the selected second stream.

7. The computer-implemented method of claim 1, wherein:
the streaming of the selected second stream is performed in a peer-to-peer (P2P) network.

8. The computer-implemented method of claim 1, further comprising:
streaming an advertisement to the first user based on the third location.

9. The computer-implemented method of claim 8, wherein:
the advertisement comprises a directed advertisement that is specifically directed to the first user based on attributes of the first user.

10. The computer-implemented method of claim 8, further comprising:
selecting the advertisement based on a time difference between the second location and the third location in the selected second stream that the one or more second users are receiving.

11. An apparatus for streaming media content to multiple users in a computer system comprising:
a computer having a memory; and
an application executing on the computer, wherein the application is configured to:
stream a first stream for the media content, from a first location in the media content, to a first user, the first stream of media content being played in a user interface;
receive a request from the first user to seek to a second location in the media content being played in the user interface, wherein the request to seek requests that the media content begin playing at the second location;
in response to receiving the request, select a second stream for the media content from a plurality of second streams for the media content being streamed to a plurality of second users at different locations in the media content, the second stream being selected based on the second location and a third location in which the selected second stream is being streamed to one or more second users;
determine the third location in the media content, the third location being different from the second location, but the third location determined to be compatible with the second location; and
stream the selected second stream to the first user and the one or more second users based on the determining of the third location.

12. The apparatus of claim 11, wherein:
the request is received from the first user by moving a slider on a progress timeline bar in the user interface for the media content.

13. The apparatus of claim 11, wherein:
the third location is based on a shot or scene of the media content.

14. The apparatus of claim 11, wherein:
the third location is determined by analyzing other second streams in the plurality of second streams being streamed to other users in addition to the selected second stream being streamed to the one or more second users.

15. The apparatus of claim 11, wherein:
the streaming of the selected second stream to the first user and the one or more second users synchronizes viewing of the media content between the first user and the one or more second users.

16. The apparatus of claim 11, wherein:
the streaming of the selected second stream to the first user and the one or more second users comprises multicasting the selected second stream.

17. The apparatus of claim 11, wherein:
the streaming of the selected second stream is performed in a peer-to-peer (P2P) network.

18. The apparatus of claim 11, wherein the application is further configured to:
stream an advertisement to the first user based on the third location.

19. The apparatus of claim 18, wherein:
the advertisement comprises a directed advertisement that is specifically directed to the first user based on attributes of the first user.

20. The apparatus of claim 18, wherein the application is further configured to:
select the advertisement based on a time difference between the second location and the third location in the second stream that the one or more second users are receiving.

21. A non-transitory computer readable storage medium containing instructions for controlling a computer system to be configured for executing a method of streaming media content to multiple users, comprising:
streaming a first stream for the media content, from a first location in the media content, to a first user, the first stream of media content being played in a user interface;
receiving a request from the first user to seek to a second location in the media content being played in the user interface, wherein the request to seek requests that the media content begin playing at the second location;
in response to receiving the request, selecting a second stream for the media content from a plurality of second streams for the media content being streamed to a plurality of second users at different locations in the media content, the second stream being selected based on the second location and a third location in which the selected second stream is being streamed to one or more second users;
determining the third location in the media content, the third location being different from the second location, but the third location determined to be compatible with the second location; and
streaming the selected second stream to the first user and the one or more second users based on the determining of the third location.

22. The non-transitory computer readable storage medium of claim 21, wherein:
the request is received from the first user by moving a slider on a progress timeline bar in the user interface for the media content.

23. The non-transitory computer readable storage medium of claim 21, wherein:
the third location is based on a shot or scene of the media content.

24. The non-transitory computer readable storage medium of claim 21, wherein:
the third location is determined by analyzing other second streams in the plurality of second streams being streamed to other users in addition to the selected second stream being streamed to the one or more second users.

25. The non-transitory computer readable storage medium of claim 21, wherein:
the streaming of the selected second stream to the first user and the second user synchronizes viewing of the media content between the first user and the one or more second users.

26. The non-transitory computer readable storage medium of claim 21, wherein:
the streaming of the selected second stream to the first user and the one or more second users comprises multicasting the selected second stream.

27. The non-transitory computer readable storage medium of claim 21, wherein:
the streaming of the selected second stream is performed in a peer-to-peer (P2P) network.

28. The non-transitory computer readable storage medium of claim 21, further comprising:
streaming an advertisement to the first user based on the third location.

29. The non-transitory computer readable storage medium of claim 28, wherein:
the advertisement comprises a directed advertisement that is specifically directed to the first user based on attributes of the first user.

30. The non-transitory computer readable storage medium of claim 28, further comprising:
selecting the advertisement based on a time difference between the second location and the third location in the second stream that the one or more second users are receiving.

* * * * *